US011999239B2

United States Patent
Bonera et al.

(10) Patent No.: US 11,999,239 B2
(45) Date of Patent: Jun. 4, 2024

(54) INDEPENDENT SUSPENSION

(71) Applicant: BRIST AXLE SYSTEMS S.R.L., Montichiari (IT)

(72) Inventors: Danilo Bonera, Collebeato (IT); Alessandro Oldrati, Grumello del Monte (IT)

(73) Assignee: BRIST AXLE SYSTEMS S.R.L., Montichiari (IT)

( * ) Notice: Subject to any disclaimer, the term of this patent is extended or adjusted under 35 U.S.C. 154(b) by 336 days.

(21) Appl. No.: 17/213,912

(22) Filed: Mar. 26, 2021

(65) Prior Publication Data
US 2021/0309098 A1 Oct. 7, 2021

(30) Foreign Application Priority Data

Apr. 2, 2020 (IT) .......................... 102020000006940

(51) Int. Cl.
*B60K 7/00* (2006.01)
*B60G 11/32* (2006.01)
*B60K 17/04* (2006.01)

(52) U.S. Cl.
CPC ............ *B60K 7/0007* (2013.01); *B60G 11/32* (2013.01); *B60K 17/046* (2013.01); *B60G 2200/10* (2013.01); *B60G 2202/152* (2013.01); *B60G 2300/02* (2013.01)

(58) Field of Classification Search
CPC .......... B60K 7/0007; B60K 2007/0061; B60G 2200/10
See application file for complete search history.

(56) References Cited

U.S. PATENT DOCUMENTS

| 3,118,687 | A | * | 1/1964 | Forbush | .................. | B60G 3/26 |
| | | | | | | 267/273 |
| 4,515,390 | A | * | 5/1985 | Greenberg | ............... | B60G 3/26 |
| | | | | | | 267/37.1 |
| 4,610,461 | A | * | 9/1986 | Guzzetta | .................. | B62D 7/00 |
| | | | | | | 280/124.134 |
| 7,703,780 | B2 | * | 4/2010 | Mizutani | .................. | B60G 3/20 |
| | | | | | | 280/124.144 |
| 8,596,395 | B2 | * | 12/2013 | Hirano | ................. | B60K 17/046 |
| | | | | | | 301/6.91 |
| 2006/0048994 | A1 | * | 3/2006 | Young | .................... | B60G 7/003 |
| | | | | | | 180/402 |
| 2014/0374178 | A1 | * | 12/2014 | Lee | ...................... | B60K 17/043 |
| | | | | | | 180/65.51 |

(Continued)

FOREIGN PATENT DOCUMENTS

| EP | 2075175 A1 | 7/2009 |
| IT | PC20100003 A1 | 7/2011 |
| WO | 2017152290 A1 | 9/2017 |

OTHER PUBLICATIONS

Italian Search Report dated Nov. 27, 2020 from counterpart Italian Patent Application No. 202000006940.

*Primary Examiner* — Brian L Swenson
(74) *Attorney, Agent, or Firm* — SHUTTLEWORTH & INGERSOLL, PLC; Timothy J. Klima

(57) ABSTRACT

An independent suspension for vehicles, in particular for the transport of people and/or materials, including a hub defining a rotation axis of the vehicle wheel, an electric motor, operatively connected to the hub and configured to put the hub in rotation. The electric motor extends along a development axis thereof parallel to the rotation axis of the hub.

18 Claims, 5 Drawing Sheets

(56) References Cited

U.S. PATENT DOCUMENTS

| | | | |
|---|---|---|---|
| 2017/0320382 A1 | 11/2017 | Milton et al. | |
| 2019/0063583 A1* | 2/2019 | Odaka | B60K 7/0007 |
| 2019/0084405 A1* | 3/2019 | Tamura | B60B 27/0021 |
| 2020/0223270 A1* | 7/2020 | Kunkel | B62D 17/00 |
| 2020/0290417 A1* | 9/2020 | Wallgren | B60G 3/20 |
| 2020/0384804 A1* | 12/2020 | Takeuchi | B60B 27/0094 |
| 2021/0167659 A1* | 6/2021 | Myouki | H02K 11/25 |
| 2021/0316605 A1* | 10/2021 | Yukishima | F16H 55/16 |

* cited by examiner

INDEPENDENT SUSPENSION

CROSS-REFERENCE TO A RELATED APPLICATION

This application claims priority to Italian Application No. 102020000006940 filed Apr. 2, 2020, which application is incorporated by reference herein.

The present invention relates to an independent suspension for vehicles. Furthermore, the present invention relates to a vehicle for the transport of people and/or materials.

The term vehicle means any type of vehicle, such as (in accordance with a non-exhaustive list) buses, couriers, trucks, lorries, special vehicles, and the like. In other words, the term vehicles can mean light, medium or heavy commercial vehicles. For example, the term vehicle refers to transport means adapted to transport people or large volumes of material (free or boxed) as well as transport luggage. Furthermore, the term vehicle can be understood as a vehicle equipped with a lowered platform.

As is known, the loading plane of such vehicles is affected by the overall structure of the frame of the vehicle itself. In particular, it is known that if the vehicle is equipped with classic axles, the same generate a footprint such as to significantly reduce the volume of the loading plane itself.

In the known art, independent-type axles are known, i.e., structured so as to allow each wheel of the same axis to move vertically (i.e., reacting to a shock on the road) independently of the other, which allow to increase, albeit by little, the volume defined by the loading plane.

Nevertheless, the existing solutions almost always have a central portion occupied by suspension or transmission elements, or if there is a free space it is not large enough to have a comfortable passage for material or people.

Therefore, the Applicant highlights that such an increase in volume is insufficient and that it can be difficult to use for a user who intends to deposit materials inside the portion defined between the independent axles. In particular, the user must literally enter the loading plane, dragging or pushing the material or baggage, trying to fit it into the space defined between the two axles, resulting in extensive time for loading the material (or baggage) inside the loading plane itself. In other words, the known axles do not allow to obtain volumes which are sufficiently large or which are so small that to be reached would require the entry into the loading platform by a luggage operator.

Furthermore, in the case of a vehicle equipped with a tailgate for loading materials (as well as a tailgate or rear door for passenger access in buses), the footprint generated by the known solutions makes it difficult and tiring for an operator to load materials.

Disadvantageously, the known solutions are therefore ineffective and do not allow to obtain a sufficient space between the suspensions which allows an adequate exploitation of the loading plane.

The technical task of the present invention is therefore to provide an independent suspension and a vehicle which are able to overcome the drawbacks arising from the prior art.

The object of the present invention is therefore to provide an independent suspension and a vehicle which allow to increase the maximum load volume transportable by the vehicle itself, in particular without level changes, facilitating loading/unloading and handling material both in terms of ergonomics and time.

A further object of the present invention is therefore to provide an independent suspension and a vehicle which allow to increase the lowered platform surface for the transit of passengers from the central area to the rear area, and vice versa.

A further object of the present invention is therefore to provide an independent suspension and a vehicle which allow to have free space in the centre of the axle in the case of special vehicles which require space, for example for the installation of machinery, for an armoured body The specified technical task and the specified objects are substantially achieved by an independent suspension and a vehicle comprising the technical features set out in one or more of the appended claims. The dependent claims correspond to possible embodiments of the invention.

In particular, the technical task specified and the objects specified are substantially achieved by an independent suspension for vehicles, in particular for the transport of people and/or materials, comprising a hub defining a rotation axis of the vehicle wheel and an electric motor, operatively connected to the hub and configured to put the hub in rotation. The electric motor extends along a development axis thereof parallel to the rotation axis of the hub.

Preferably, the development axis of the electric motor and the rotation axis of the hub lie on a plane obliquely arranged with respect to a horizontal or vertical reference plane passing through the rotation axis of the hub. In other words, the development axis of the electric motor is angularly positioned around the rotation axis of the hub.

Preferably, the development axis of the electric motor and the rotation axis of the hub lie on the same vertical plane or on the same horizontal plane. In other words, the development axis of the electric motor and the rotation axis of the hub lie on the horizontal or vertical reference plane.

Advantageously, such a configuration allows to obtain an independent suspension which is compact and suitable to obtain an additional space (i.e., additional volume) with which to load a greater amount of people or materials (or luggage) on the vehicle or for different use in special vehicles.

Preferably, the independent suspension further comprises a transmission system, for putting the wheel hub in rotation by means of the electric motor, comprising a speed reducer developing along a development axis perpendicular to the rotation and development axes, an input shaft between the electric motor and the reducer and an output shaft between the reducer and the hub. Preferably, the reducer defines a spacer element between the development axis of the electric motor and the rotation axis of the hub. Advantageously, the distance at which the electric motor and rotation axis of the hub are spaced allows a more compact suspension to be obtained.

Preferably, at least the input shaft and the reducer are equipped with cylindrical gears geared to each other or realize a motion transmission by means of drive belts.

Furthermore, the technical task and the objects specified are achieved by a vehicle for loading people and/or materials comprising an independent suspension as above for each wheel of the vehicle itself. The suspensions coupled to each other have a corridor having a width between 500 and 1000 mm so as to define an auxiliary load volume. Preferably, the width of the corridor varies as a function of the roadway of the vehicle.

Further features and advantages of the present invention will become more apparent from the description of an exemplary, but not exclusive, and therefore non-limiting preferred embodiment of an independent suspension and a vehicle.

Such a description will be set out hereinafter with reference to the accompanying drawings given only for illustrative and, therefore, non-limiting purpose, in which.

Figure 1:
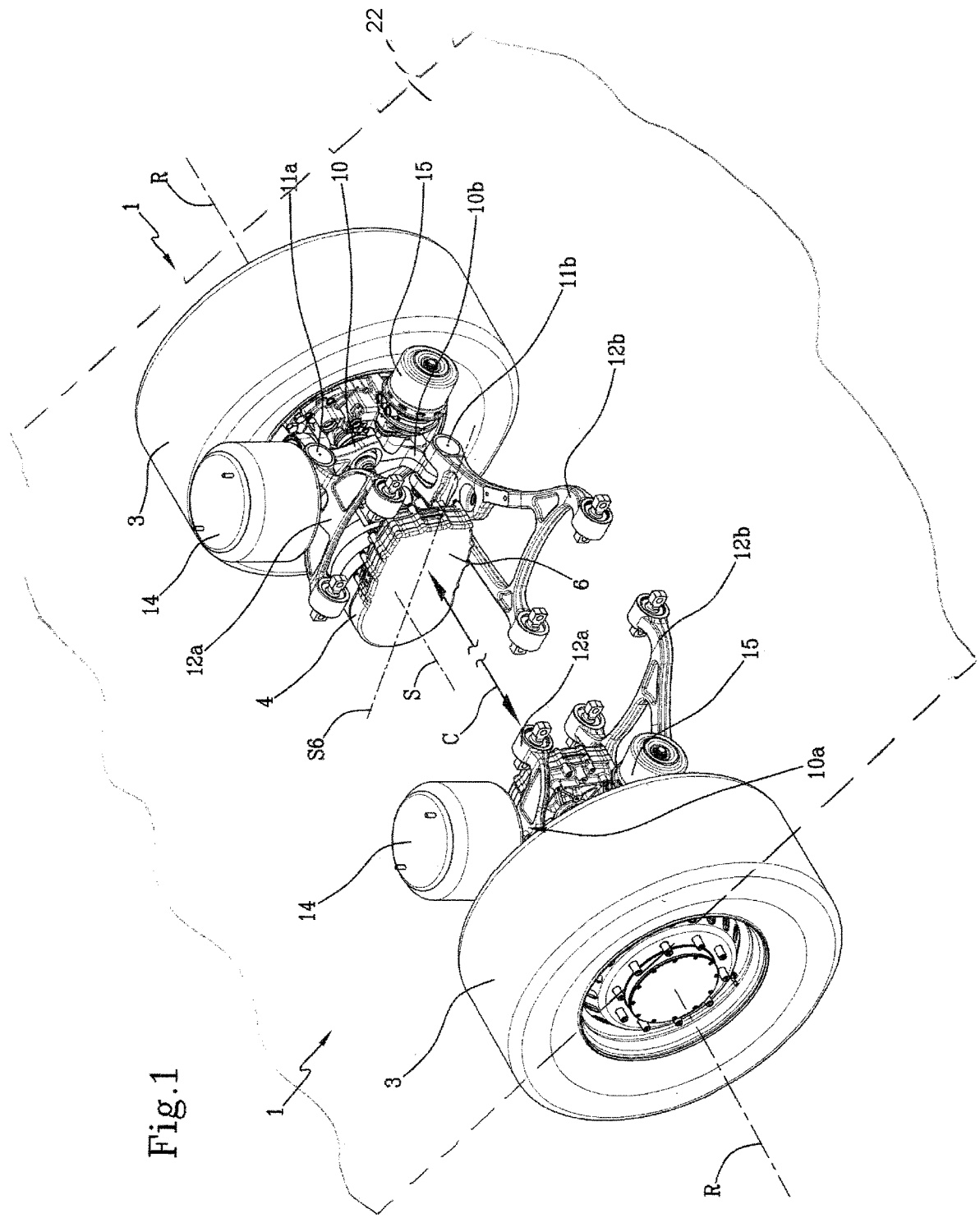
FIG. 1 is a perspective view of an axle object of the present invention.
Figure 2:
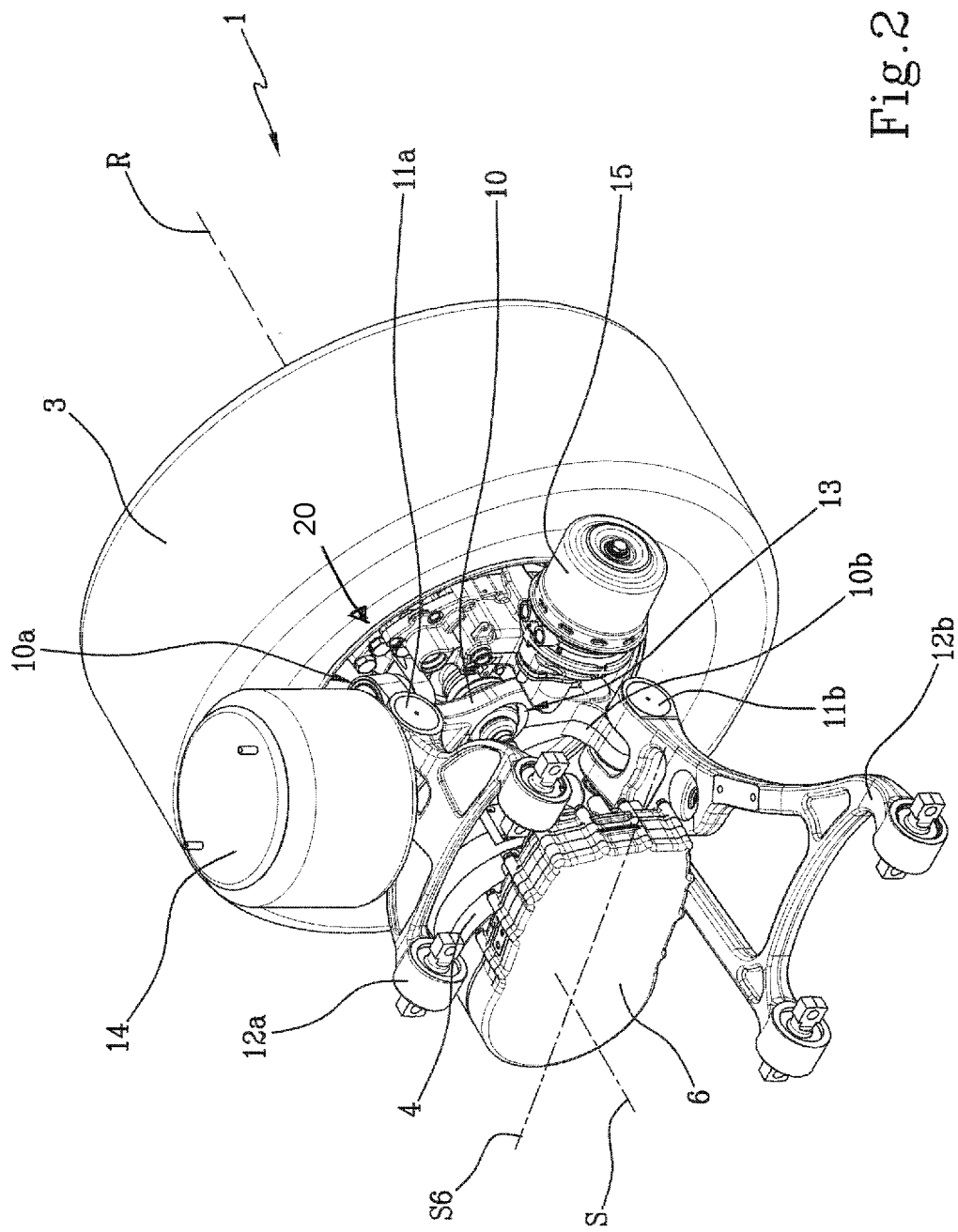
FIG. 2 is a perspective view of an independent suspension object of the present invention.

With reference to the accompanying figures, 1 refers overall to an independent suspension for vehicles, in particular for the transport of people and/or materials which, for the sake of disclosure simplicity, will be indicated hereinafter as independent suspension 1.

The term "vehicle" means any type of vehicle, such as (in accordance with a non-exhaustive list) buses, couriers, trucks, lorries, special vehicles, and the like. In other words, the term vehicle can mean light, medium or heavy commercial vehicles. For example, the term vehicle refers to transport means adapted to transport people or large volumes of material (free or boxed) as well as transport luggage. Furthermore, the term vehicle can be understood as a vehicle equipped with a lowered platform.

The independent suspension 1 comprises a hub 2 defining a rotation axis "R" of a wheel 3 of the vehicle 22.

The independent suspension 1 further comprises an electric motor 4, operatively connected to the hub 2 and configured to put the hub 2 itself in rotation.

The electric motor 4 extends along a development axis "S" thereof parallel to the rotation axis "R" of the hub 2.

Preferably, the development axis "S" of the electric motor 4 and the rotation axis "R" of the hub 2 lie on a plane obliquely arranged with respect to a horizontal or vertical reference plane passing through the rotation axis "R" of the hub 2. In other words, the development axis "S" of the electric motor 4 is angularly positioned around the rotation axis of the hub.

Preferably, the development axis "S" of the electric motor 4 and the rotation axis "R" of the hub 2 lie on the same vertical plane. In other words, the development axis "S" of the electric motor and the rotation axis "R" of the hub 2 lie on the vertical reference plane.

As for example shown in the accompanying figures, the development axis "S" of the electric motor 4 and the rotation axis "R" of the hub 2 lie on the same horizontal plane "O". In other words, the development axis "S" of the electric motor 4 and the rotation axis "R" of the hub 2 lie on the horizontal reference plane.

In other words, the development axis "S" of the electric motor 4 can have any angular positioning with respect to the rotation axis "R" of the hub 2 as a function of the constructional needs of the vehicle on which the independent suspension 1 must be installed and in particular as a function of the volume to be obtained from the loading plane of the vehicle.

Figure 4:
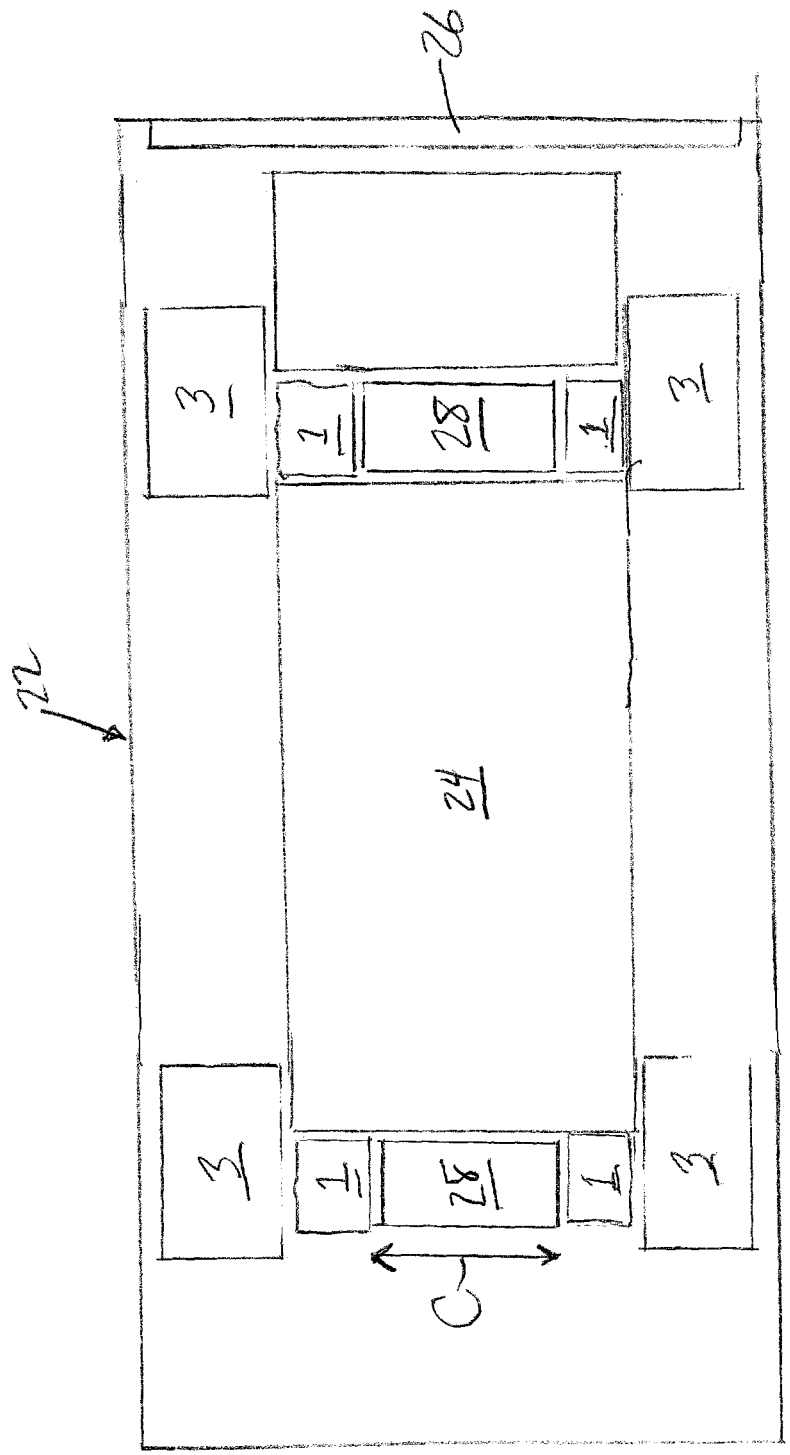
FIG. 4 is a partial top plan schematic view of the vehicle.
Figure 5:
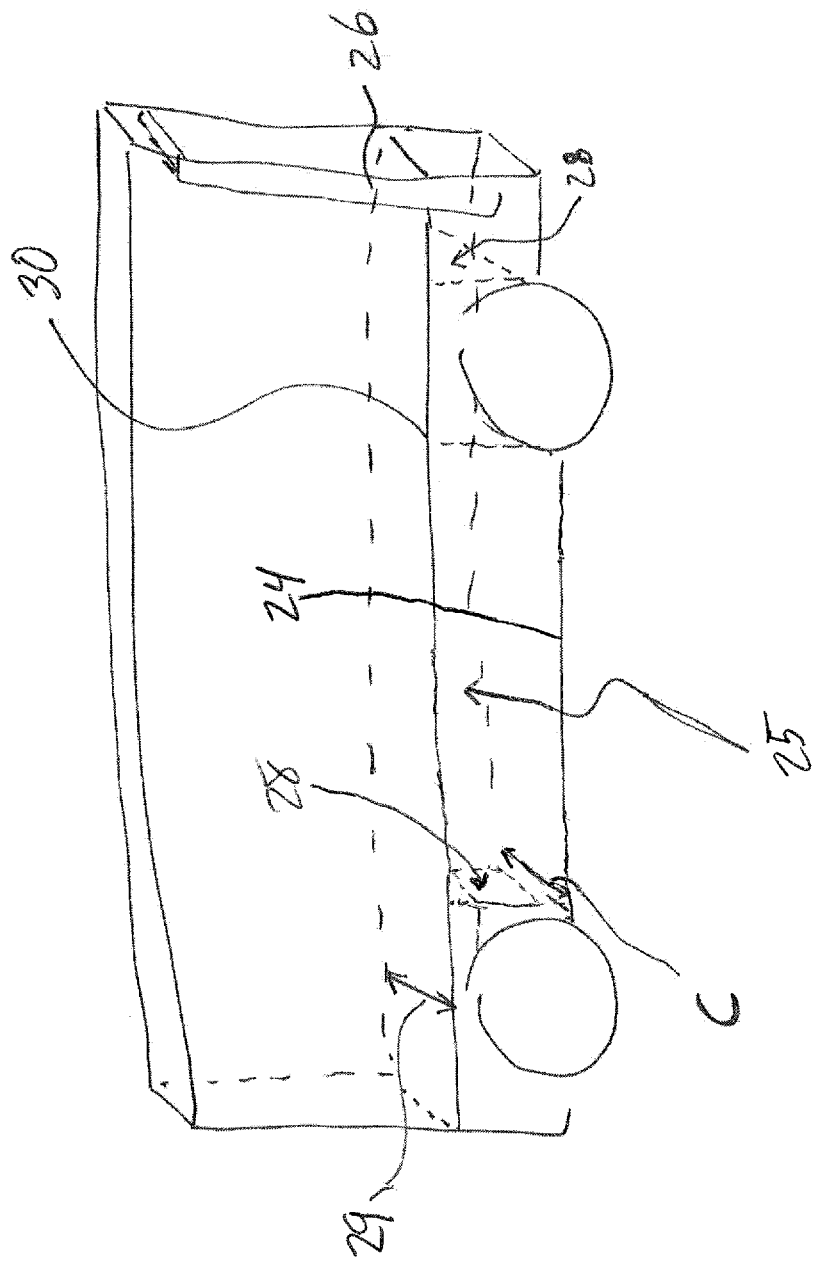
FIG. 5 is a partial side perspective schematic view of the vehicle.

Advantageously, the above solutions allow to obtain an independent suspension 1 equipped with a highly compact structure and capable of saving space in a lowered loading platform 24 (i.e., in a loading plane) of a vehicle. See FIGS. 4-5. In other words, the particular positioning of the electric motor 4 with respect to the rest of the structure of the independent suspension 1 allows to obtain a greater volume in a loading plane, thus allowing a greater load of materials or luggage.

Furthermore, the compactness of the independent suspension 1 allows easy access or transit to the lowered platform 24, for example in the case of a vehicle equipped with a lowered platform and access tailgate 26. In other words, the independent suspension 1 advantageously allows access and/or transit in the rear area of the vehicle while keeping the platform lowered (without level changes).

As for example shown in the accompanying figures, the independent suspension 1 comprises a transmission system 5 for putting the wheel 3 hub 2 in rotation by means of the electric motor 4. Such a transmission system 5 comprises a reducer 6, an input shaft 7a, and an output shaft 7b.

The reducer 6 develops along a development axis "S6" thereof perpendicular to the rotation axis "R" and development axis "5".

The input shaft 7a is interposed between the electric motor 4 and the reducer 6. In other words, the input shaft 7a is the motor shaft of the electric motor 4 (or it is a further shaft connected or connectable to the motor shaft). The development axis of the input shaft 7a coincides with the development axis "5" of the electric motor 4.

The output shaft 7b is interposed between the reducer 6 and the hub 2. In other words, the output shaft 7b is the transmission shaft configured to transmit the rotation movement of the first input shaft 7a so as to put the hub 2 in rotation. The development axis of the output shaft 7b coincides with the rotation axis "R" of the hub 2.

Preferably, the ends of the reducer 6 coincide with the respective development axes "5" of the electric motor 4 and the rotation axis "R" of the hub 2. In other words, the reducer 6 defines a spacer element between the development axis "5" (i.e., the input shaft 7a) and the rotation axis "R" (i.e., the output shaft 7b).

Advantageously, the distance at which the electric motor and rotation axis of the hub are spaced allows a more compact suspension to be obtained.

The reducer 6 is therefore equipped with kinematics suitable for the transmission of the rotational motion between the input shaft 7a and the output shaft 7b.

Preferably, at least the input shaft 7a and the reducer 6 are equipped with cylindrical gears geared to each other.

Alternatively, at least the input shaft 7a and the reducer 6 realize a motion transmission by means of drive belts.

The output shaft 7b is connected to the hub 2 and reducer 6 by means of respective junction elements. Such junction elements 9 are manufactured, as shown for example in the accompanying figures, in the form of homokinetic joints. The term homokinetic joints means joints capable of maintaining a constant drive ratio between the input shaft 7a and the output shaft 7b. In particular, the homokinetic joint allows the drive ratio to be kept constant regardless of the inclination of the shafts with respect to the other components while the vehicle is travelling. In other words, the homokinetic joint connecting the output shaft 7b with the reducer 6 ensures the transmission of the rotational motion to the output shaft 7b whatever the inclination thereof with respect to the components of the reducer 6. Similarly, the homokinetic joint connecting the output shaft 7b with the hub 2 ensures the transmission of the rotational motion of the hub 2 whatever the inclination of the output shaft with respect to the hub 2.

Advantageously, in the case of holes in the ground or other undesired vibrations, the homokinetic joint allows to maintain the desired transmission ratio.

Advantageously, the homokinetic joint is slim and ensures high performance.

In use, the input shaft 7a transmits the rotational motion to the reducer 6 by means of the cylindrical gear thereof (or by using the drive belt). In other words, the cylindrical gear puts the cylindrical gear of the reducer 6 in rotation which thus puts the output shaft 7b in rotation which, taking advantage of the use of the homokinetic junction elements 9, puts the hub 2 in rotation.

The entire solution described above allows to ensure a high compactness of the transmission system 5 thus guaranteeing the desired dimensional features for the independent suspension 1 in order to obtain as much space as possible within a lowered plane of a vehicle of the type previously discussed.

Preferably, the transmission system 5 can be of the single speed type (such as that described above)

Preferably, the transmission system 5 can be of the multiple speed type. In other words, the components previously described for the transmission system 5 can be modified as a function of the fact that it is intended to obtain a multi-gear transmission system.

Figure 3:
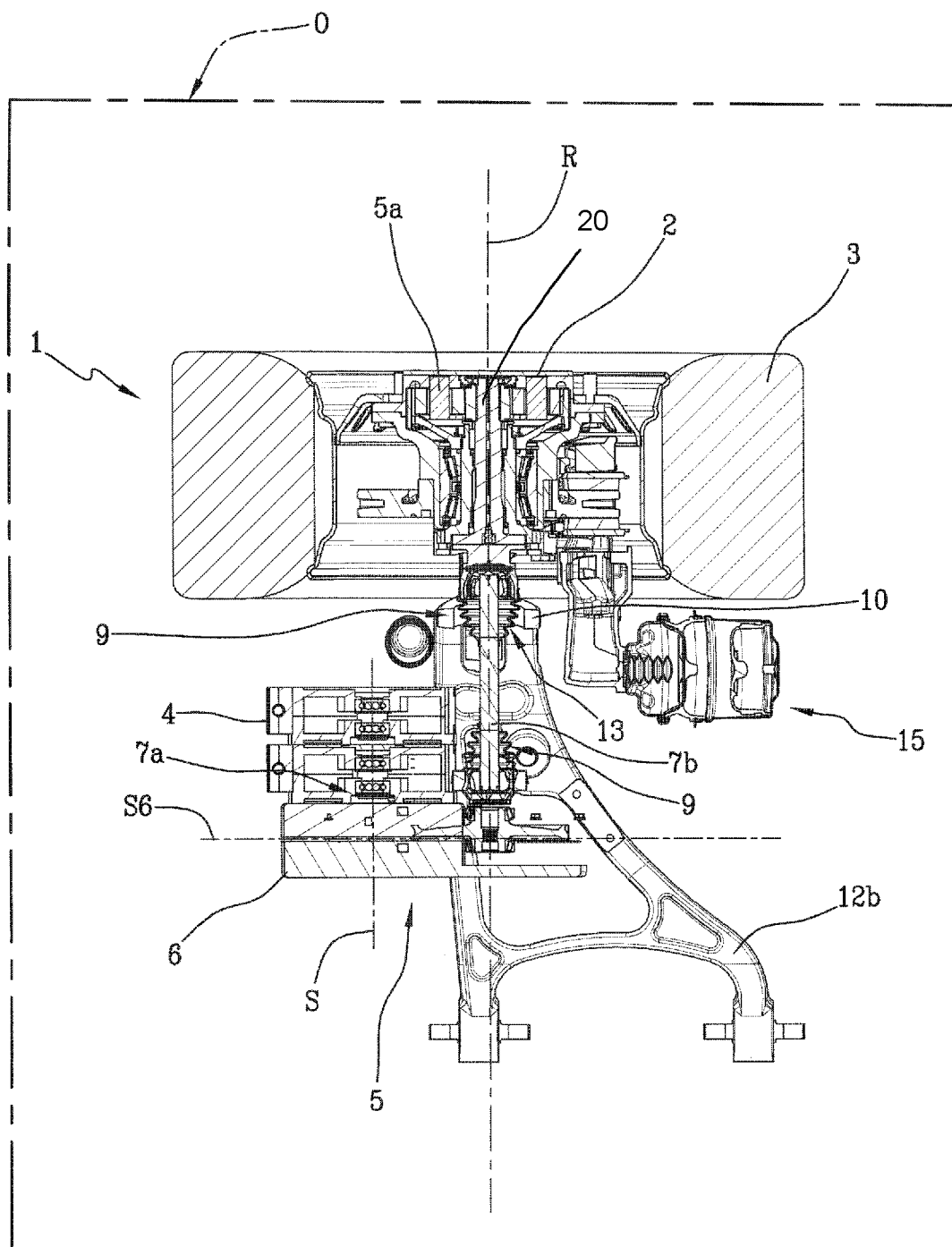
FIG. 3 is a horizontal sectional view of the suspension of FIG. 2.

Preferably, the transmission system 5 comprises an epicyclic gear system 5a, i.e., a planetary gear (as for example shown in FIG. 3).

The epicyclic gear system 5a is installed on the hub 2 and is configured to reduce the torque transmitted through the input shaft 7b (i.e., through the junction elements 9). In other words, the epicyclic gear system 5a has the possibility of supporting the transmission even during steering. It is thereby possible to obtain a steering system.

Preferably, and as depicted in the accompanying figures, the independent suspension 1 comprises a support element 10 provided with a first 10a and a second support portion 10b defining, respectively, a hinge point (11a and 11b), substantially horizontal, for a respective cross arm (12a and 12b) end. The first support portion 10a is arranged in an upper portion of the support element 10 and the second support portion 10b is arranged in a lower portion of the support element 10.

Preferably, the hinge points 11a and 11b are defined by pins rigidly constrained to the respective support portion 10a and 10b and rotatably coupled, by means of bearings or slides, with the respective cross arm 12a, 12b.

Preferably, and as shown in the attached figures, the support element 10 is equipped with a special opening 13 configured to allow the passage of the junction element 9 to couple the reducer 6 to the hub 2. In other words, the opening 13 is configured to allow the accommodation of the homokinetic joint so as to allow the connection of the output shaft 7b to the hub 3 in order to transmit the rotation movement.

Preferably, the independent suspension 1 comprises a steering spindle 20 comprising an outer portion, defining the rotation axis "R" of the hub 2 of the vehicle wheel 3, and an inner portion extending transversely to the outer portion along a steering axis. Preferably, the steering axis is transverse to the rotation axis of the hub 2, more preferably inclined with respect thereto by an angle in the range between 60° and 90°, more preferably between 75° and 85°, in particular of about 80°.

In such a configuration, the support element 10 is rotatably coupled to the inner portion of the spindle to allow a relative rotation around the steering axis.

In other words, the independent suspension 1 described in the present invention can be of the non-steering type or of the steering type.

Preferably, the first support portion 10a is equipped with a spring 14 or damper and the second support portion can be provided with a shock absorber (not shown). Generally, said spring 14 and shock absorber are connected or connectable to the vehicle frame and define a pneumatic suspension system.

Preferably, if the development axis "S" of the electric motor 4 is positioned along the vertical reference plane, instead of a spring 14 (as the electric motor 4 is present) a cylinder defining a hydraulic suspension system is present.

As shown in the accompanying figures, the independent suspension 1 can further be equipped with an actuator 15 for the brake.

Advantageously and as already underlined above, the independent suspension 1 object of the present invention is capable of overcoming the drawbacks emerging from the prior art.

Advantageously, the independent suspension 1 has a compact structure suitable for obtaining additional volumes inside a loading plane of a vehicle, in particular of a lowered platform vehicle.

Furthermore, the solution described above is particularly versatile, resulting in a structure adaptable as a function of the construction needs of the reference vehicle.

Advantageously, the independent suspension 1 also results in a simplified structure which can be easily assembled/disassembled and therefore has no particularly difficult maintenance.

Advantageously, the particular positioning of the electric motor 4 with respect to the wheel 3 hub 2 allows to obtain a greater corridor (i.e., the space between two axles coupled along the same "axis") with respect to that obtainable from the known independent axles, in which the axis of the electric motor tends to coincide with the rotation axis of the hub (in other words the electric motor occupies the space which is instead obtained with the present invention).

The present invention further relates to a vehicle for loading people and/or materials comprising an independent suspension 1 (according to one or more of the previously described forms) for each wheel 3 of the vehicle itself. In other words, if the vehicle has, for example, eight wheels (i.e., four pairs of wheels 3), the same will further be equipped with eight independent axles 1 such as those described above.

The independent suspensions 1 coupled together have a corridor "C" between 500 and 1000 mm so as to define an auxiliary load volume 28. In other words, the distance between two coupled wheels 3 obtained by using the independent suspension 1 described above allows to obtain a greater volume with respect to that which would normally be obtainable from the known solutions in which the same would be absent or so small so as not to be usable or easily reachable. Such a solution is particularly advantageous for heavy vehicles with a lowered platform.

Preferably, the vehicle further comprises a loading plane 24 for loading luggage or other materials having a main load volume 25 and a number of auxiliary load volumes 28 equal to the number of pairs of independent axles 1 present in the vehicle. See FIGS. 4-5. Each auxiliary load volume 28 has a width equal to the corridor "C". It follows that the length of each auxiliary load volume 28 (i.e., the dimension parallel to the main development dimension of the vehicle) is equal to the extension of the structure of the independent suspension 1.

Preferably, the vehicle can further comprise a tailgate 26 for loading people and/or materials. In other words, the vehicle allows access and transit in a rear area, keeping the platform lowered without requiring level changes.

Preferably, the vehicle further comprises a plane 30 configured for supporting passengers equipped, near the independent suspensions, with an abutment width 29 substantially equal to the corridor "C" allowing to obtain an auxiliary passenger support surface and therefore a greater overall support surface.

Advantageously, the vehicle described above has a lowered plane equipped with a greater usable volume with respect to that of the known heavy vehicles. In other words, the vehicle described above allows to transport a greater load with respect to that of vehicles of a known type.

Furthermore, the vehicle described above allows to transport a greater number of people and/or luggage (in the case of buses for example) and therefore of materials (in the case of trucks for the transport of goods and the like).

Advantageously, the present invention provides an independent suspension and a vehicle which allow to increase the maximum load transportable by the vehicle itself.

Advantageously, the present invention provides an independent suspension and a vehicle which allow to increase the useful surface on which a passenger or other user can walk.

Advantageously, the independent suspension can be used for small wheels (for example those of a car or small vehicle) or for larger wheels (such as buses or the like).

Advantageously, the independent suspension allows to increase the free space of the central body of vehicles such as logistics or special means.

Advantageously, the present invention is applicable on any suspension having a structural diagram different from that illustrated in the accompanying figures.

The invention claimed is:

1. An independent suspension for a vehicle for transport of at least one chosen from people and materials, comprising:
   a hub defining a rotation axis of a wheel of the vehicle;
   an electric motor, operatively connected to said hub and configured to put said hub in rotation, said electric motor extending along a first development axis thereof;
   wherein said first development axis of the electric motor is parallel to the rotation axis;
   said electric motor extending towards said hub along said development axis from a starting point where the electric motor drivingly connects to the hub, to a final point of the electric motor opposite the starting point, where said final point faces towards said hub.

2. The independent suspension according to claim 1, further comprising a transmission system, for putting the wheel hub in rotation by said electric motor, comprising a speed reducer developing along a second development axis thereof perpendicular to said rotation axis and first development axis, an input shaft between the electric motor and the speed reducer, and an output shaft between the speed reducer and the hub.

3. The independent suspension according to claim 2, wherein at least said input shaft and said speed reducer include cylindrical gears geared to each other or realize a motion transmission by drive belts.

4. The independent suspension according to claim 2, and further, comprising a support element including a first support portion and a second support portion defining a substantially horizontal hinge point for a respective cross arm end.

5. The independent suspension according to claim 4, and further comprising a junction element formed as a homokinetic joint, wherein said output shaft is connected to said hub and to said speed reducer by the junction element.

6. The independent suspension according to claim 5, wherein said support element includes an opening configured to allow passage and accommodation of said junction element.

7. The independent suspension according to claim 4, comprising a steering spindle comprising an outer portion, defining said rotation axis, and an inner portion extending transversely to the outer portion along a steering axis.

8. The independent suspension according to claim 7, wherein the support element is rotatably coupled to the inner portion of the steering spindle to allow a relative rotation around the steering axis.

9. The independent suspension according to claim 4, wherein said first support portion includes a spring or damper and wherein said second support portion includes a shock absorber.

10. The independent suspension according to claim 2, wherein said transmission system is configured as a single speed transmission or a multiple speed transmission.

11. The independent suspension according to claim 2, wherein said transmission system comprises an epicyclic gear system installed on the hub.

12. The independent suspension according to claim 2, wherein said electric motor is positioned between said hub and said speed reducer.

13. The independent suspension according to claim 1, wherein said first development axis of the electric motor and said rotation axis lie on a plane obliquely arranged with respect to a horizontal or vertical reference plane passing through said rotation axis.

14. The independent suspension according to claim 1, wherein said first development axis of the electric motor and said rotation axis lie on a same vertical plane or on a same horizontal plane.

15. A vehicle for transport of at least one chosen from persons and materials comprising the independent suspension according to claim 1 for each wheel of the vehicle, said independent suspensions coupled to each other having a corridor between 500 and 1000 mm to define an auxiliary load volume.

16. The vehicle according to claim 15, further comprising a loading platform for loading luggage or other materials having a main load volume and a number of auxiliary load volumes equal to a number of pairs of independent suspensions present in the vehicle, each auxiliary load volume having a width equal to said corridor.

17. The vehicle according to claim 16, further comprising a tailgate for loading the at least one chosen from people and materials.

18. The vehicle according to claim 15, further comprising a plane configured to support passengers and including, near said independent suspensions, an abutment width substantially equal to said corridor.

* * * * *